(12) United States Patent
Garrido et al.

(10) Patent No.: US 11,184,415 B2
(45) Date of Patent: Nov. 23, 2021

(54) MEDIA FEED PRIORITIZATION FOR MULTI-PARTY CONFERENCING

(71) Applicant: Apple Inc., Cupertino, CA (US)

(72) Inventors: Christopher M. Garrido, Cupertino, CA (US); Dazhong Zhang, Milpitas, CA (US); Karthick Santhanam, Cupertino, CA (US); Patrick Miauton, Cupertino, CA (US); Xiaoxiao Zheng, Cupertino, CA (US); Bess Chan, Cupertino, CA (US); Peter Shiang, Cupertino, CA (US); Sudeng Hu, Cupertino, CA (US); Peikang Song, Cupertino, CA (US); Xiaosong Zhou, Cupertino, CA (US)

(73) Assignee: Apple Inc., Cupertino, CA (US)

(*) Notice: Subject to any disclaimer, the term of this patent is extended or adjusted under 35 U.S.C. 154(b) by 121 days.

(21) Appl. No.: 16/405,864

(22) Filed: May 7, 2019

(65) Prior Publication Data

US 2019/0342351 A1    Nov. 7, 2019

Related U.S. Application Data

(60) Provisional application No. 62/679,669, filed on Jun. 1, 2018, provisional application No. 62/668,137, filed on May 7, 2018.

(51) Int. Cl.
*H04L 29/06* (2006.01)
*H04L 29/08* (2006.01)
(Continued)

(52) U.S. Cl.
CPC .......... *H04L 65/403* (2013.01); *H04L 65/607* (2013.01); *H04L 67/14* (2013.01); *H04N 21/2353* (2013.01); *H04N 21/6583* (2013.01)

(58) Field of Classification Search
CPC ....... H04L 67/14; H04L 65/80; H04L 65/607; H04L 65/403; H04N 21/2353; H04N 7/147; H04N 21/6583
See application file for complete search history.

(56) References Cited

U.S. PATENT DOCUMENTS 5,623,490 A * 4/1997 Richter ............... H04L 12/1818
                                              348/E7.081
9,001,701 B1    4/2015 Zhang et al.
(Continued)

FOREIGN PATENT DOCUMENTS

EP    2677744 A1    12/2013
JP    11-177953 A    7/1999

OTHER PUBLICATIONS

International Patent Application No. PCT/US2019/031155; Invitation to Pay Add'l Fees; dated Oct. 24, 2019; 19 pages.
(Continued)

*Primary Examiner* — Philip J Chea
*Assistant Examiner* — Mohammed Ahmed
(74) *Attorney, Agent, or Firm* — BakerHostetler

(57) ABSTRACT

Techniques presented herein provide an improved relay user experience and improved management of scarce computing and network resources as the number of relay endpoints increases. A sourcing endpoint device may generate a media feed, such as video and/or audio feed, representing contribution from a conference participant. The sourcing endpoint device may generate a priority value for the media feed, and the priority value may be transmitted to other members of the relay along with the input feed. Priority values of the different relay participants may be used by other devices, for example, intermediate servers or receiving endpoint devices, to manage aspects of the relay. For example, a relay server may prune streams from select endpoint devices based on relative priority values received from those devices. Alter-
(Continued)

natively, receiving endpoint devices may alter presentation of received feeds based on their associated priority values.

28 Claims, 8 Drawing Sheets

(51) Int. Cl.
*H04N 21/235* (2011.01)
*H04N 21/6583* (2011.01)

(56) References Cited

U.S. PATENT DOCUMENTS

| | | |
|---|---|---|
| 9,743,042 B1 | 8/2017 | Faulkner |
| 2005/0191028 A1* | 9/2005 | Matsuda ............ H04N 21/4348 386/277 |
| 2012/0320924 A1* | 12/2012 | Baliga ................ H04L 47/828 370/400 |
| 2013/0132510 A1* | 5/2013 | Ye ....................... H04N 19/174 709/217 |
| 2014/0063177 A1* | 3/2014 | Tian ....................... H04N 7/152 348/14.07 |
| 2016/0285895 A1* | 9/2016 | Zheng ................... G06F 21/552 |
| 2016/0285985 A1* | 9/2016 | Molettiere .......... G06F 3/04842 |
| 2016/0343351 A1* | 11/2016 | Chen ..................... G06F 3/1454 |
| 2017/0154473 A1 | 6/2017 | Goossens |
| 2017/0359552 A1 | 12/2017 | Kobayashi |
| 2018/0152670 A1* | 5/2018 | Zhou ................... H04N 21/4334 |
| 2018/0176508 A1* | 6/2018 | Pell ........................ H04N 19/85 |

OTHER PUBLICATIONS

International Patent Application No. PCT/US2019/031155; Int'l Search Report and the Written Opinion; dated Dec. 16, 2019; 24 pages.

International Patent Application No. PCT/US2019/031155; Int'l Preliminary Report on Patentability; dated Nov. 19, 2020; 16 pages.

* cited by examiner

100

200

300

400

600

700

800

Example Data Streams

| | |
|---|---|
| A1 | Audio, high quality |
| A2 | Audio, low quality |
| V1 | Video, high quality |
| V2 | Video, medium quality |
| V3 | Video, low quality |
| S1 | other sensor data |
| P | Priority metadata |
| F | Viewer preference feedback |

FIG. 9

MEDIA FEED PRIORITIZATION FOR MULTI-PARTY CONFERENCING

CROSS REFERENCE TO RELATED APPLICATIONS

This application claims the benefit of priority under 35 USC 119(e) of U.S. provisional application No. 62/679,669, filed on Jun. 1, 2018, entitled, "MULTI-PARTY RELAY SYSTEMS," and U.S. provisional application No. 62/668,137, filed on May 7, 2018, entitled "MEDIA FEED PRIORITIZATION FOR MULTI-PARTY CONFERENCING," the disclosures of which are incorporated herein by reference in their entirety.

BACKGROUND

Communication protocols have been developed that support multi-party conferencing (e.g., three or more participants to a common communication session). Conference endpoint devices, for example as might be found in teleconferencing or videoconferencing systems, generally include both input devices, such as a microphone and camera, and output devices, such as speakers and a display. The input devices capture data, such as audio and video, from local participants, while output devices present data received from other remote endpoints, for example via a display and speakers. In a two-party conference, such as a simple phone call, an output device at a local endpoint need only present data captured at the single remote endpoint. However, in conferences with three or more participants, data captured at more than one endpoint may be available to be presented at any receiving endpoint. As the number of participants increases, the number of feeds of media data from remote endpoints increases, and all those feeds may potentially be presented on output devices of a single receiving endpoint device. The complexity of session management techniques increases commensurately.

BRIEF DESCRIPTION OF THE DRAWINGS

FIGS. 5a and 5b are an example timing diagrams for transmission of layered multimedia data.

FIG. 9 is an example of data streams sent from a source endpoint of a relay.

DETAILED DESCRIPTION

Techniques presented herein provide conference management techniques that conserve computing and network resources for communication sessions involving a large number of endpoint devices. A sourcing endpoint device may generate a media feed, such as video and/or audio feed, representing contribution from a conference participant. The sourcing endpoint device may generate a priority value for a media feed it is sourcing, and the priority value may be transmitted to other members of a conference session along with the input feed. Priority values of the different session participants may be used by other devices, for example, relay servers or receiving endpoint devices, to manage aspects of the session. For example, a relay server may prune streams from select endpoint devices based on relative priority values received from those devices, such that a relay server may not relay streams with a lower priority to receiving endpoints. Alternatively, receiving endpoint devices may alter presentation of received feeds based on their associated priority values.

Figure 1:
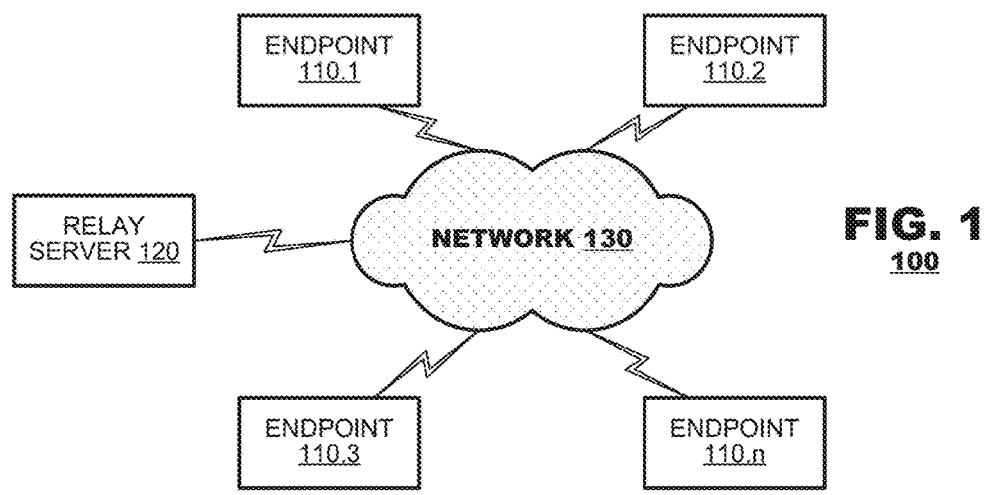
FIG. 1 illustrates an example system for multi-party relay.

FIG. 1 illustrates system 100 that may participate in a multi-party session according to an aspect of the present disclosure. The system may include a plurality of endpoint devices 110.1-110.$n$ and a relay server 120 provided in communication via a network 130. Each endpoint 110.1-110.$n$ may generate data streams that are to be transmitted to other endpoint devices 110.1-110.$n$. The endpoints 110.1-110.$n$ also may receive data streams from the other endpoints 110.1-110.$n$ for presentation. As its name implies, the relay server 120 may receive the data streams from the various endpoints 110.1-110.$n$ and relay the data streams to the other endpoints 110.1-110.$n$. The relay server 120 also may engage session management processes to control the amount or data transmitted to each receiving endpoint 110.1-110.$n$, as discussed herein.

In an aspect, each endpoint 110.1-110.$n$ may generate a variety of data streams that contain locally-generated content that is to be presented at other endpoints. For example, the endpoints 110.1-110.$n$ may generate audio feeds, video feeds, and/or closed caption feeds. In The endpoints may generate multiple instances of each type feeds; for example, a single endpoint (say 110.1) may generate a first video feed representing locally-captured video of an endpoint operator and it also may generate a second video feed representing video generated locally by an application (not shown) that executes on the endpoint 110.1. The types and content of the data feeds are immaterial to the present discussion unless discussed herein. In some examples, an endpoint may capture data, such as with a mic and/or camera, and may encode the captured audio and/or video with an encoder to generate the data streams.

In an aspect, each endpoint 110.1-110.$n$ also may generate priority metadata representing a priority assignment conferred on the data feed(s) output by the respective endpoint. The metadata may be included within the data feeds themselves, or it may be sent and received out of band and separately from the metadata's associated media feeds. The priority metadata may contain values that vary over time in accordance with variations in the data feeds. In an aspect, the relay server 120 may manage conference relay functions in accordance with priority metadata assigned to the different data feeds that it receives from the endpoints 110.1-110.$n$. Based on the priority metadata, the relay server 120 may invoke certain session management functions to the received data. For example, the relay server 120 may perform "stream thinning" in which it relays data feed(s) having relatively high priority values and it declines to relay other data feed(s) having low priority values. Alternatively, the relay server 120 may perform frame decimation by, for example, dropping certain frames from data streams having relatively low priorities but transmitting all frames of data feed(s) having relatively high priorities. These session management functions achieve resource conservation in the network 130 because network resources will not be expended to transmit low priority streams to all endpoints 110.1-110.n. Other examples of stream management functions are described herein below.

Figure 2:
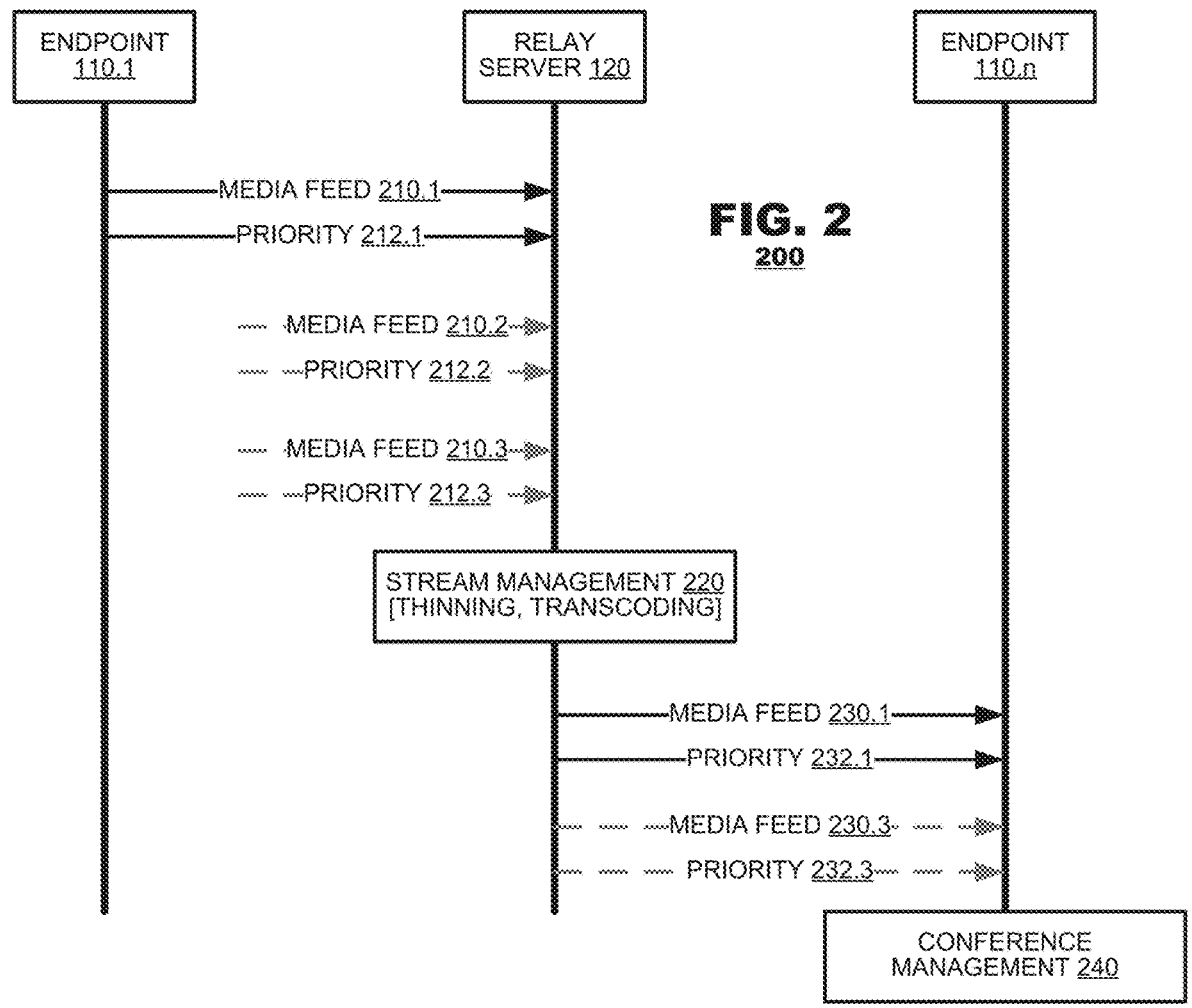
FIG. 2 illustrates an example communication timeline for a relay

FIG. 2 illustrates an exemplary communication session according to an aspect of the present disclosure. In this example, endpoint 110.1 send a media feed 210.1 and associated priority 212.1 to relay server 120. Relay server 120 may also receive additional media feeds and associated priorities from other receivers, such as media feeds 210.2, 210.3 and priorities 212.2, 212.3. Relay server 120 may perform stream management 220 on the media steams it receives based on the priorities it receives. Relay server 120 may then send one or more media feeds 230.1, 230.3 and associated priorities 232.1, 232.3 to endpoint 110.n. Endpoint 110.n may then perform conference management of the media feeds 230.1, 230.3 it receives based on the associated priorities. 232.1, 232.3.

Stream management may be performed in a variety of ways. As discussed above, stream management may include "thinning" of data streams, where lower priority streams are not transmitted to a given endpoint device in favor of other stream(s) with higher priority. Stream management may include frame decimation, where certain frames of lower priority streams are removed from a data stream, yielding a resultant data stream having a lower frame rate and, by extension, a lower data rate. In one embodiment where the video is coded using a motion-compensation coding protocol, frames may be selected for decimation that do not alter prediction chains defined within the coded video (e.g., removed frames are not prediction references for other frame(s) in the stream).

In a further aspect, lower priority data feeds may be transcoded by a relay server 120. That is, the data streams may be decoded by a video coding protocol then recoded, either by the same or other coding protocol to reduce the stream's bit rate. Prior to re-coding, the decoded stream may be subject to frame decimation, spatial downsampling, cropping or other image processing that causes the data stream to be recoded at a lower quality level than was used when the data stream was coded by its source endpoint. Additionally, the data stream may be recoded using a high quantization parameter than was used when the data stream was coded by its source endpoint, which would cause the recoded data stream to have a lower data rate.

In another aspect, stream management 220 may include management of audio streams. For example, lower priority audio stream may be dropped by not relaying one or more received lower priority audio stream onto receiving endpoints. In one example, only the highest priority audio stream is relayed onto receiving endpoints. Alternately, any audio stream with an associated priority below a threshold is dropped. In other examples, a lower priority audio stream may be transcoded to reduce audio volume of lower priority streams. In addition to reducing downstream network resource usage, muting by dropping a stream may improve an endpoint user experience by reducing or eliminating audio that is more likely to be distracting than beneficial to the user.

Endpoint conference management 240 may be performed in a variety of ways. A receiving endpoint may present received or available feeds based on associated priorities to improve a user experience at the receiving endpoint. For example, lower priority audio feeds may be muted or have their volume reduced. Lower priority video feeds may not be presented at all, may be presented within a smaller window, or may be presented in a different region of a video display. Conversely, higher priority video feeds may be presented in a larger window or a more prominent region of a video display. In one aspect, a video window with a highest associated audio priority may be highlighted, such as with a brightly colored border around the window.

Figure 3:
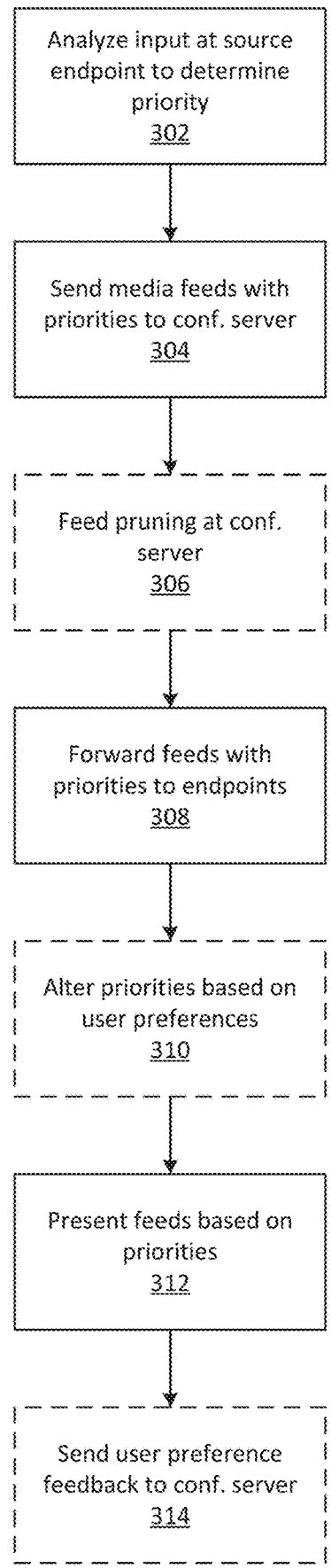
FIG. 3 is a flowchart of an example method for prioritizing relay feeds.

FIG. 3 is a flowchart of an example method for prioritizing conference session feeds. Input captured at a source endpoint may be analyzed to determine one or more associated priorities (box 302). Media feeds are then sent from the source endpoint along with associated priorities to a relay server (box 304). A relay server may optionally perform feed pruning (box 306) before forwarding on feeds and associated priority metadata onto other endpoints (box 308). A receiving endpoint may optionally alter the priorities it receives based on user preferences (box 310) before presenting received media feeds (box 312). Finally, a receiving endpoint may send viewing preference feedback to the relay server (box 314).

In some cases, a single priority value may be determined for the media feed(s) sourced from an endpoint in box 302. For example, a single priority value may be provided for the combination of a video and an audio media feed. In other cases, separate priority values may be provided for each media feed sourced from a single endpoint. For example, an audio feed and a video feed from a single endpoint may each have an associated priority value.

Priority values for a media stream may be determined at the endpoint source of that media stream by analyzing input at that endpoint to determine one or more priority factors. For example, priority values may be derived from the volume detected in an audio stream, where louder captured volume may indicate a higher priority than another feed that has a lower captured volume. Priority values may be derived from voice activity detection; when voice activity is detected, it may indicate a higher priority than at other times when no voice activity is detected. Priority values may be derived from speech recognition processes; when certain recognized words or phrases are detected, it may be a factor to indicate higher priority.

In another aspect, priority values may be derived from the presence of closed caption information in video feeds, or detection of use of sign language. Presence of close caption information or use of sign language may lead to relatively high priority assignments. Priority values may be derived from lip motion detection from video and may be a factor indicating higher priority. Joint video and audio speech detection may correlate detected visual lip motion and detected audio speech, where a negative correlation may indicate a speech from off-camera and hence a lower priority value. A particular gesture, detected either from video or motion sensors, may indicate a user wishes a priority value associated with a sourced or received media feed should be changed. For example, a priority value may be increased or decreased, or that a priority value should be set to the minimum or maximum value.

In another aspect, a source endpoint device may derive its priority value in part from data received from receiving endpoint device(s). For example, receiving end point devices may determine their local viewing environments, which may present certain video feeds in large-window formats and other video feeds in smaller-window formats or in a minimized display mode (e.g., removed from display). Alternatively, the receiving endpoint devices may determine which audio feeds are enabled and which others are muted.

Receiving end point devices may report their presentation state as feedback to the source endpoint devices that generate the feeds that are displayed, not displayed, enabled and/or muted, which the source endpoint devices may integrate into their priority derivations.

In box 304, media feeds may be sent with associated priorities embedded in the media feed itself or may be sent out-of-band in a separate communication channel or with a separate communication protocol.

In addition to priority values in box 304, metadata sent from a source may include other sensor data, such as from a heart rate monitor; physical motion, such as sensed from an accelerometer in a watch warn by a viewer; the results of analysis of locally captured media feeds, such as eye tracking data from captured video, voice detection and speech recognition from captured audio, and lip motion detection from captured video; an indication of synthetically generated image stickers and animojis that may be overlaid on, or inserted into, video; or any combination thereof.

In box 306, a relay server may perform session management based on the received associated priority values. In one aspect, the server may perform stream pruning in which it selects certain media streams received from endpoints that it forwards other receiving endpoints but it does not filter other streams (box 308). For example, a relay server may forward only the media streams having priority values above a predetermined threshold, or only the highest priority media stream for each type (such as the audio stream with the highest priority and the video stream with the highest priority), or a predetermined number of feeds (say, ten feeds) having the highest relative priority values. Alternately, stream pruning may include dropping all media feeds below a certain predetermined threshold. Feed pruning may beneficially save communication resources such bandwidth between a relay server and receiving endpoints. Feed pruning may also improve viewer experience by, for example, reducing audio noise by eliminating lower priority audio streams that are more likely to contain only noise.

In another aspect, a relay server may perform session management by altering certain media feeds before forwarding them to endpoint devices. For example, a relay server may transcode video feed(s) having priority values that are below a predetermined threshold to lower bitrate, lower quality representations. In another aspect, a relay server may transcode motion picture video feed(s) to still image representation(s) while the priority values of those feeds remain below a predetermined threshold.

In systems where using a relay server receives multi-tiered media feeds, for example via HLS, the relay server may select lower quality or lower bitrate tiers for feeds with corresponding lower priorities, while selecting higher quality or high bitrate tiers for feeds with higher priorities.

Input at an endpoint may also be used to indicate media feed presentation preferences in box 310. Some input may be used to determine either a source priority in box 302 or view preferences in box 310. Eye tracking in a sourced image feed may be used as a factor to indicate viewer preference of other received feeds. For example, a viewer that is detected as looking for a long time at a small window presenting a received video feed may be a factor indicating that viewer's preference is to raise the priority of that received video feed. In response, the endpoint device may alter the priority of that video feed (box 310) and may additionally send the raised priority as viewer feedback to the conference server (box 314).

In box 312, media feeds may be presented based on associated priorities. For example, audio feeds with lower associated priority values may have volume reduced or be muted entirely at a receiving endpoint. Image feeds may be arranged or sized based on priority, for example as indicated in screen 150 of FIG. 1.

A receiving endpoint may feedback metadata associated with media feeds received from other endpoints. Such feedback may indicate presentation preferences at the receiving endpoint, and the feedback metadata may be sent back to a conference server (box 314). For example, if a user at an endpoint prefers a large window for a video freed from a certain other sourcing endpoint even though priority associated feeds from the sourcing endpoint video is low, feedback metadata from the receiving endpoint may be sent back to the relay server or other endpoints to indicate that the video feed from that sourcing endpoint was preferred over other media feeds. A relay server, upon receiving feedback that one or more receiving users have a preference for a media feed, may employ conference management techniques such as raising the priority of the preferred feed. Conversely, if a relay receives feedback that a feed is not preferred, for example when a receiving endpoint mutes an audio feed or closes a window of a video feed, a relay server may prune the feed with feedback that it is not preferred even when the feed's associated source priority is high.

In some aspects, a source endpoint device may generate media feeds according to a multi-tier coding protocol in which media data (say, a video feed) is represented in different quality representations. For example, video feeds may be generated having high-, medium- and low-quality representations, each with high, medium and low bit rate requirements. The video feeds may be output to a relay server, which may publish data regarding such representations to receiving endpoint devices. In an aspect, receiving endpoint devices may receive data from the relay server according to a "pull" communication protocol in which endpoint devices request segments of a desired tier of service via a URL or other network identifier. In an embodiment, the endpoint devices may select a service tier of a given media feed with reference to the feed's priority information. For example, the tiers of service may be published to endpoint devices via a manifest file according to the HLS protocol, which the relay server may create from the feeds provided by source endpoints; such manifest files may store priority information representing the priorities of different portions of the media feed, which the sink endpoints may reference when selecting a tier of service.

In some aspects, separate input feeds at a source endpoint may be assigned separate priority values. For example, audio and video from the same source endpoint may be assigned separate priority values. In other aspects, a single priority value may be assigned to all feeds and data types captured at a single endpoint. In some aspects, a priority value may be embedded in a media feed that it rates, in other aspects, a priority value may be communicated independently of its corresponding media feed(s).

A priority value may be assigned at a source endpoint based: on analysis of the media feeds generated at the source endpoint; other (non-media) inputs at the source endpoint such as mouse clicks from an endpoint user; or feedback received from remote receiving endpoints. In simple examples, a louder audio feed may be given a higher priority than a quitter audio feed, and video feed with more motion may be given a higher priority than a video feed with less motion. In some aspects, a priority associated with a feed may be a single scalar value.

Prioritization of media feeds may lead to conservation of network resources. Higher priority feeds may be allocated more resources while lower priority feeds may be less resources or no resources. For example, a relay server may only forward high priority feeds to receiving endpoints, while lower priority feeds from source endpoints are not forwarded, thereby reducing the bandwidth used to transmit feeds to receiving endpoints. Alternately, a relay server may choose to transmit higher-quality, higher-bandwidth versions of feeds with accompanying high priority values to receiving endpoints, while the relay server may choose to transmit lower-quality, lower-bandwidth versions of feeds with accompanying low priority values. In some aspects, source endpoints may provide multiple quality versions of a single feed to a relay server, for example a multi-tier protocol such as HTTP Live Streaming (HLS) or MPEG-DASH. In other aspects, a lower-quality version of a media feed may be constructed at a relay server. In yet another aspect, multiple lower priority feeds may be combined into a single feed, while higher priority feeds are passed on without being combined with other feeds.

In an aspect, receiving endpoints may control screen displays in response to priority metadata they receive from source endpoints. For example, a receiving endpoint may allocate display real estate based on different streams' relative priority values. In one aspect, image feeds with an associated high priority value may presented in a large window, while image feeds with associated lower priority value may be presented in comparatively smaller windows. In another aspect, an endpoint display may be separated into distinct regions, and image feeds may be assigned to one of the distinct regions based on associated priority values. For example, all feeds above a threshold priority maybe presented in a primary region of the endpoint display called a canvas, while feeds below a threshold may be presented in a secondary region of the endpoint display called a roster. In other aspects, image feeds with associated priority values below a cut-off threshold may not be displayed at all.

Prioritization of media feeds may also enable improved user experience in a variety of ways. Audio feeds may be muted or reduced in volume when an associated priority value below a threshold or lower than other priority values. A feed with a highest priority value may be highlighted, for example by framing an associated image feed with a distinct color.

Figure 4:
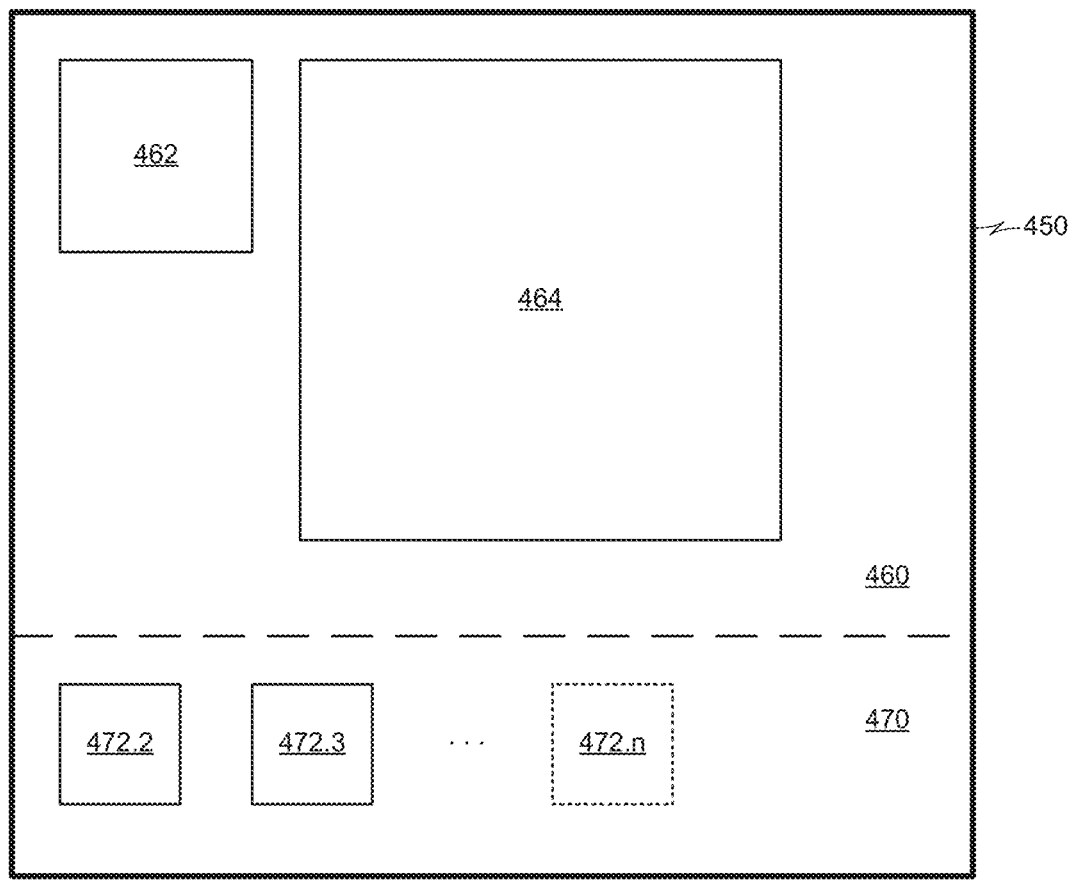
FIG. 4 is an example display user interface presented by an endpoint device

FIG. 4 is an example display user interface presented by an endpoint device, such as endpoint 110.1 of FIG. 1. Screen 450 is separated into two regions including a roster area 470 and a canvas area 460. The roster area 470 may include small windows for all other endpoints. For example, window 472.2 may present an image feed from endpoint 110.2, window 472.3 may present an image feed from endpoint 110.3, and windows 472.$n$ may present an image feed from endpoint 110.$n$. In some aspects, image feeds with an associated priority value below a threshold may not be presented in the roster area 470.

Canvas area 460 may include larger windows for selected image feeds. For example, window 462 may contain an image feed captured at the endpoint 110.1, and window 464 may contain the image feed of the image feed received from other endpoints with the highest associated priority. In other aspects, canvas area 460 may include multiple top priority image feeds, or all image feeds above a threshold. Image feeds may be selected for inclusion in canvas area 460 based on associated received priorities. For example, the highest associated priority may be determined instantaneously based on only the most current received priority values, or the highest priority may be determined by an average over time and may include hysteresis to avoid rapidly switching back and for the between image feeds. In some cases, a received priority value associated with an audio feed from a particular endpoint may be used to determine selection of a video feed from the same endpoint.

Figure 5A:
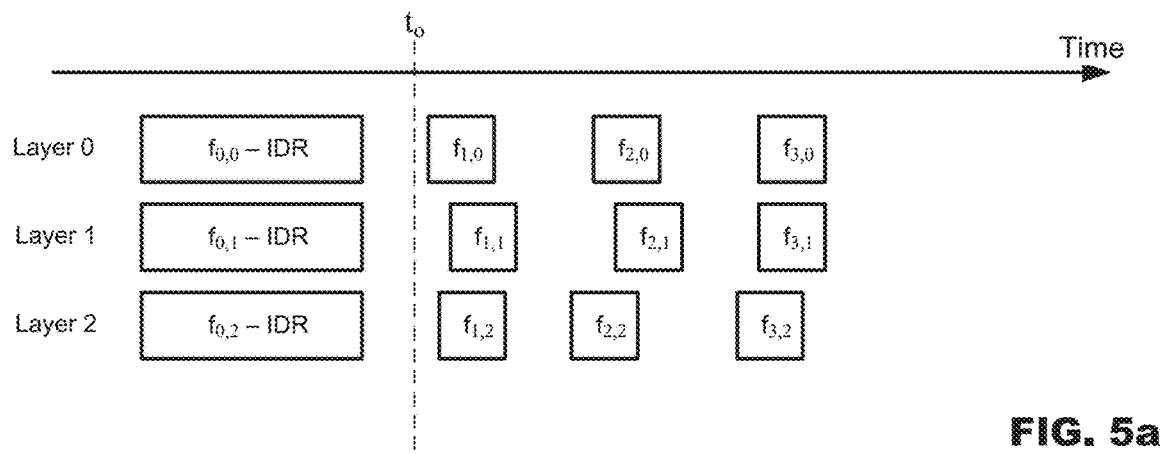
FIG. 5a depicts an example of stored layered multimedia data.
Figure 5B:
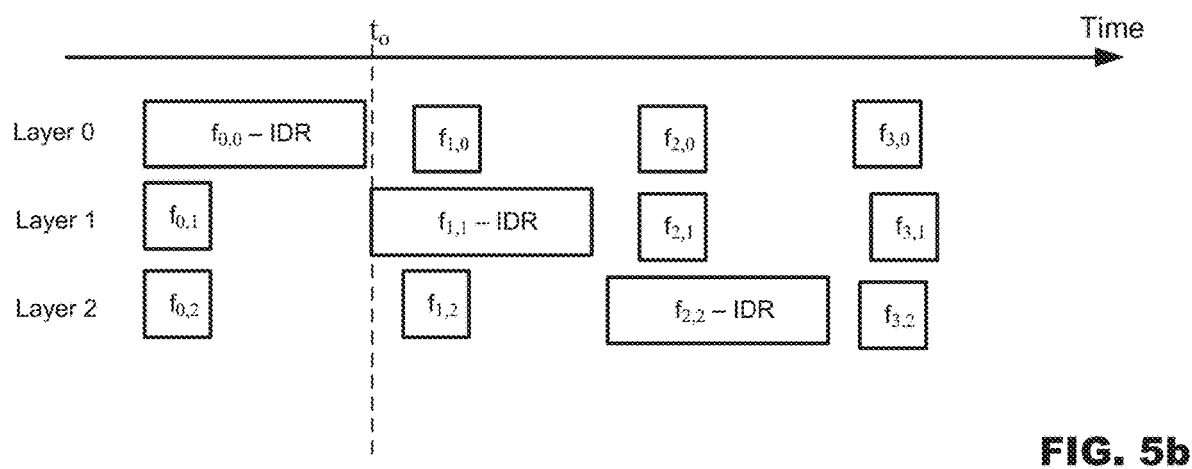

FIGS. 5$a$, 5$b$, and 5$c$ are diagrams depicting examples of transmission timing for video data with instantaneous decoder reference (IDR) frames. The examples of FIGS. 5$a$ and 5$b$ include transmission of multiple layers, while the example of FIG. 5$c$ includes transmission to multiple clients. Management of the transmission times of IDR frames from either a source endpoint or a relay server may conserve network resources by reducing peak bandwidth or reducing latency. IDR frames are typically much larger than other encoded data frames. IDR frames may enable stream switching, such that a decoder may start decoding a video data feed at the beginning of an IDR frame.

In FIGS. 5$a$ and 5$b$, a video stream be coded into multiple layers, and the notation $f_{x,y}$ represents a frame or other portion of coded multimedia data for layer y at media time x. FIG. 5$a$ includes IDR frames $f_{0,0}$, $f_{0,1}$, and $f_{0,2}$. Layer 0 includes non-IDR frames $f_{1,0}$, $f_{2,0}$, and $f_{3,0}$ which follow DR frame $f_{0,0}$. Layers 1 and 2 similarly have non-IDR frames following the respective IDR frame. In FIG. 5$a$, the IDR frames at different layers are synchronized to a common media time.

Instantaneous decoder reference (IDR) frames are sometimes encoded in all layers of a layered coding system at the same media time. In the example of FIG. 5$a$, IDR frames $f_{0,0}$, $f_{0,1}$, and $f_{0,2}$ are all encoded to correspond to media time 0. In order to facilitate switching smoothly between layers, IDR frames may be synchronized across layers, and switching to any layer may be constrained to only occur at the media time of the synchronized IDR frames.

FIG. 5$b$ is an example timing diagram for transmitting layered multimedia data. FIG. 5$b$ includes IDR frames $f_{0,0}$, $f_{1,1}$, and $f_{2,2}$. Layer 0 includes non-IDR frames $f_{1,0}$, $f_{2,0}$ and $f_{3,0}$ following IDR frame $f_{0,0}$. Layers 1 and 2 have non-IDR frames both preceding and following the respective IDR frames. In FIG. 5$b$, the IDR frames at different layers are staggered and not transmitted at the same transmission time. The IDR frames in FIG. 5$b$ need not correspond to a common media time.

When an endpoint source such as 110.1 of FIGS. 1 and 2 sends multimedia data encoded as layers to a server such as relay server 120 of FIGS. 1 and 2, bandwidth may be limited along a single network link between the endpoint and the relay server. Furthermore, IDR frames typically are much larger than non-IDR frames because IDR frames refresh the state of a decoder, while non-IDR frames re-use state that is developed from decoding of previously transmitted frames. The combination of large IDR frames and limited-bandwidth single communication channel for transmitting layered data may result in very large latencies when IDR frames from different layers are transmitted simultaneously. By spreading IDR frames from different layers across different transmission times may result in reduced latencies, such as between a source endpoint of a session and a server.

In an example embodiment at a sourcing endpoint of a session that encodes captured multimedia with a layered encoding system, the sourcing endpoint may encode a plurality of IDR frames, each IDR frame corresponding to respective layers of a layered multimedia coding system at a common media time; and then sending the IDR frames sequentially at different transmission times to a receiver such as a rely server.

Figure 5C:
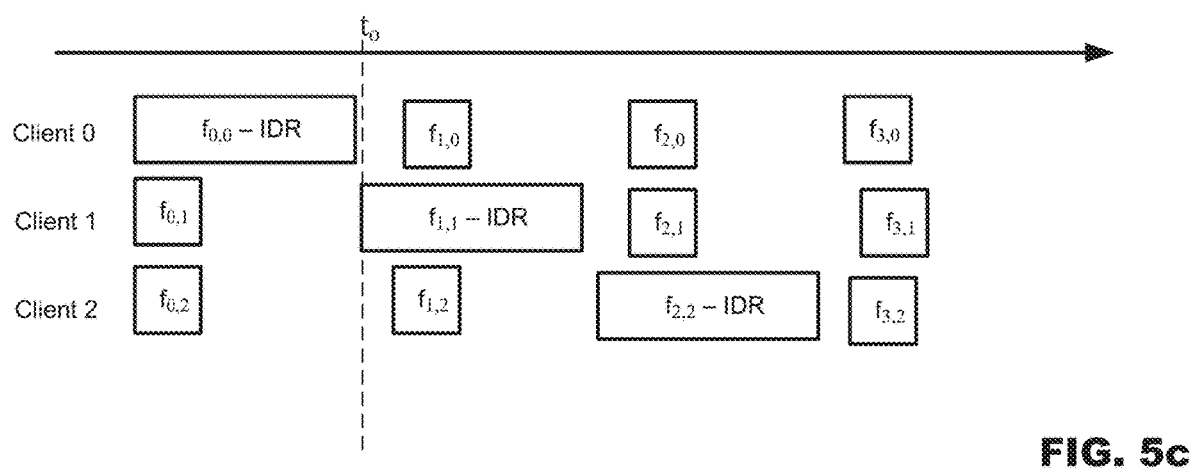
FIG. 5c is an example timing diagram for transmission to multiple receiving clients.

FIG. 5$c$ is a timing diagram for transmitting multimedia data to multiple receiving clients. The notation $f_{x,z}$ for data FIG. 5c represents a frame or other portion of coded multimedia data intended for client z at media time x. FIG. 5c includes IDR frames $f_{0,0}$, $f_{1,1}$, and $f_{2,2}$. The media stream for client 0, such as a receiving endpoint of a session, includes non-IDR frames $f_{1,0}$, $f_{2,0}$ and $f_{3,0}$ following IDR frame $f_{0,0}$. Media streams for clients 1 and 2 have non-IDR frames both preceding and following the respective IDR frames. In FIG. 5c, the IDR frames in the media streams for different clients are staggered and not sent at the same transmission time. The IDR frames in FIG. 5c need not correspond to a common media time.

Some portion of the network connections between a server and endpoints may be shared across the connections to all endpoints. Hence simultaneous transmission of IDR frames to multiple client may incur large latencies, similarly to the layered coding example of FIG. 5a. In FIG. 5c, these latencies may be reduced by staggering transmission times of IDR frames to different receiving endpoints.

In an example embodiment at a multimedia relay server, the server may receive one or more of IDR frames from endpoint sources, each IDR frame corresponding to respective layers of a layered multimedia coding system at a common media time. Then the server may send an IDR frame of the one or more DR frames to each of a plurality of receivers, where the IDR frames are sent sequentially at different transmission times to each of the plurality of receivers In the IDR spreading examples of FIGS. 5b and 5c, it may be advantageous to further spread the IDR frames by causing a delay between the IDR frames of the layers or client endpoints. In one aspect, such a delay between IDR frames may be based at least in part on the periodicity of I-frames in one or more of the streams. In another aspect, such a delay between IDR frames may be based at least in part on an estimated bitrate of all layers and an estimated peak bandwidth.

Figure 6:
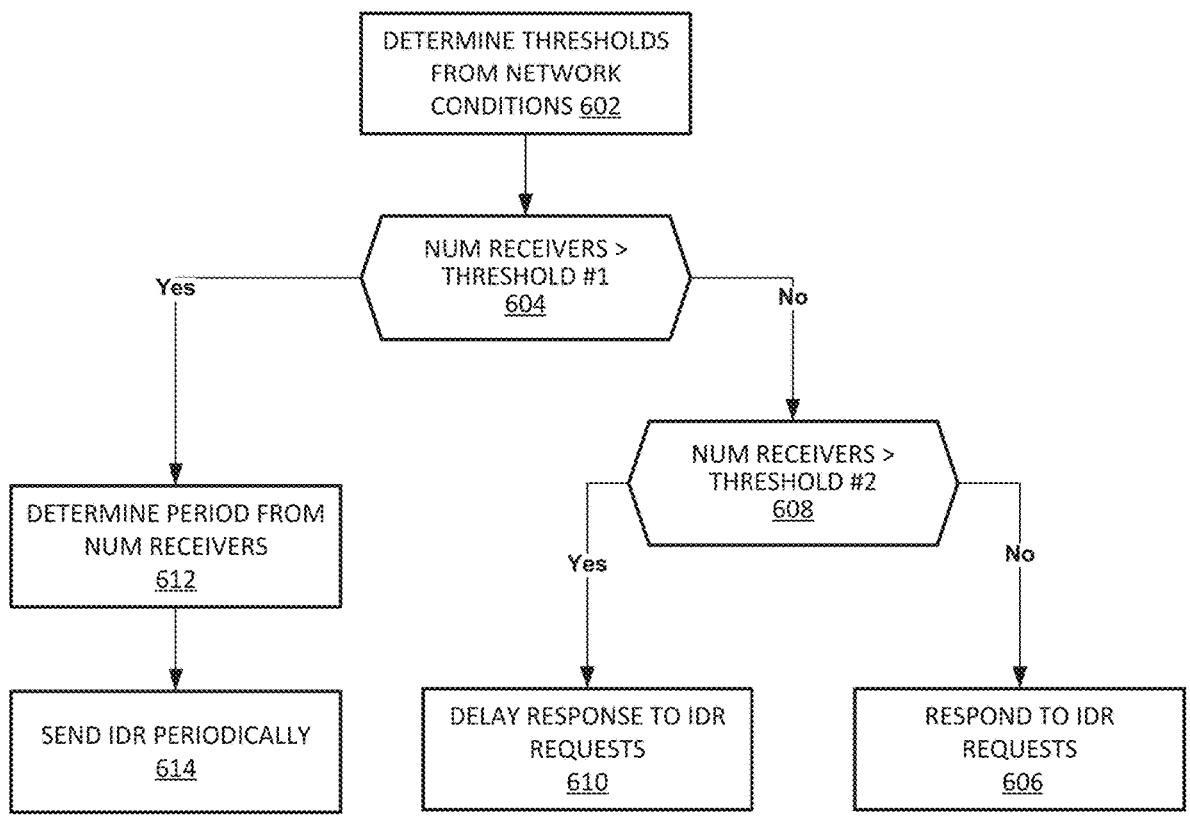
FIG. 6 is a flowchart of an example resilience method based on a relay group size.

FIG. 6 is a flowchart of an example error resilience method 600 based on a session group size. In FIG. 6, thresholds are determined based on network condition, such as between a relay server and receiving endpoints (box 602). If the number of receiving endpoints is greater than a first threshold (box 604), then an interval period is determined based on the number of receiving endpoints (box 612), and IDR frames are sent periodically based on the determined period to the various receiving endpoints (box 614). If the number of receiving endpoints is not greater than a first threshold (box 604) but is greater than a second threshold, then IDR requests from a receiving endpoint may be responded to after a delay with an IDR frame to the requesting endpoint (box 610). If the number of receiving endpoints is not greater than a first threshold (box 604) and is also not greater than a second threshold, then IDR requests from a receiving endpoint may be responded to when the request is received without a delay by sending an IDR frame to the requesting endpoint (box 606).

In an aspect, the frequency at which IDR frames are transmitted may be limited to accommodate limited communication bandwidth. As explained above, IDR frames are generally larger than other frames. A receiving endpoint may request an IDR, for example due to packet loss or other errors in the network. A transmitter, such as a multimedia relay server, may accommodate a receiver's request for an IDR by send a previous or new IDR to the requester. As the number of receiving endpoints increase, and as the network conditions worsen (for example as frequency of packet loss increases), the frequency of IDRs requested by receiving endpoints may increase. At some point as the frequency of sending IDRs increases, the available network bandwidth may be exceeded. Hence, techniques for limiting the frequency of sending IDRs may improve performance of multimedia systems with poor network conditions or a larger number of receiving endpoints. Under good network conditions or low numbers of receiving endpoints, a relay server may simply respond to IDR requests as they are received from endpoints. As network conditions worsen or as the number of receiving endpoints increase, a delay may be induced between receiving an IDR request and responding to the IDR request. By delaying the IDR response until multiple IDR requests are received, the number of IDRs sent to receiving endpoints is reduced, which may improve new bandwidth usage. For example, an IDR response may be delayed by a fixed time, such as 0.5 seconds, following a first IDR request. Alternately, an IDR response may be delayed until IDR requests have been received from a predetermined number of receiving endpoints. When network conditions are worst and/or the number of receiving endpoints is greatest, a relay server may send IDRs only periodically based on the number of receiving endpoints, and the relay server may otherwise not respond directly to requests for IDRs.

Figure 7:
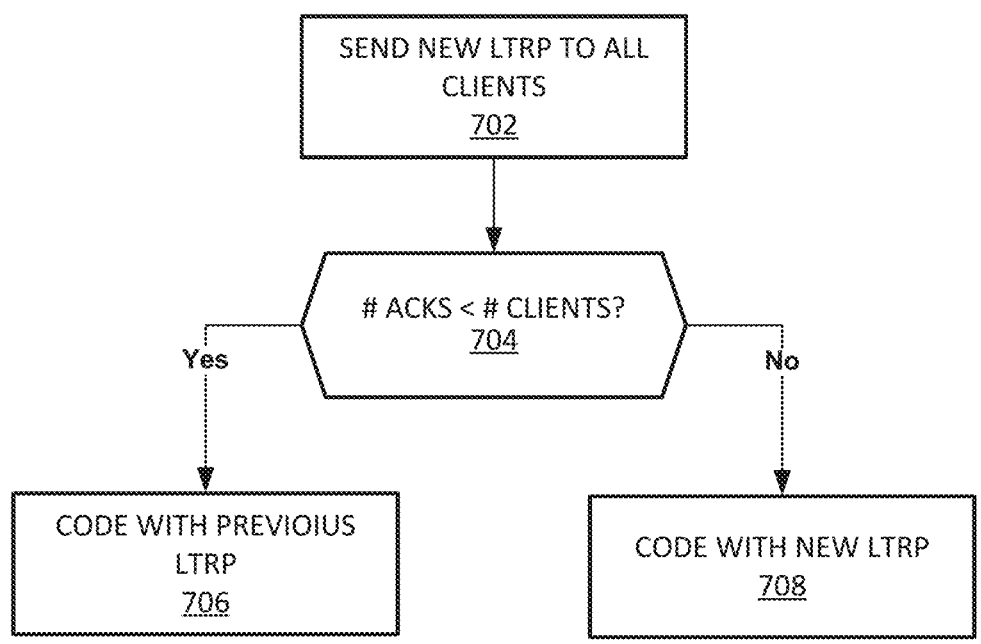
FIG. 7 is a flowchart of a method for managing long term reference pictures (LTRPs) with multiple receiving endpoint clients.

FIG. 7 is a flowchart of a method for managing long term reference pictures (LTRPs) with multiple receiving endpoint clients. In the example of FIG. 7, a new LTRP is sent to all client endpoints (box 702), for example from a multimedia relay server. When a client receives an LTRP, it may respond with an acknowledgement (ACK) of the new LTRP. If the number of ACKs received for the new LTRP is less than the number receiving endpoints (box 704), image data may continue to be encoded with a previously acknowledged LTPR (box 706). Alternately, if every receiving client has acknowledged the new LTRP (box 704), then image data may start to be encoded with the new LTRP (box 708).

Management of long term reference pictures as in FIG. 7 may be advantageous with unreliable network communications to improve reliability. For example, an LTRP may not be used at a decoder as a motion prediction reference if it has not been correctly received due to a network communication failure such as packet loss. However, a previous correctly received LTRP may continue to be used as a motion prediction reference until a new LTRP is correctly received. An ACK may be sent back to an encoder to indicate that a new LTRP was correctly received by a decoder and that the encoder may start encoding prediction references using the new LTRP. In situations where there are multiple decoding clients, an encoder may not safely encode prediction references from a newly sent LTRP until ACKs are received from all subscribed decoding clients. In an alternate example, such as where they number of decoding clients is large, encoding with a newly sent LTRP may start once ACKs have been received only by some portion of clients and not every client. The portion of client used to determine when encoding with the new LTRP start may be, for example, a percentage of a number of subscribed on known clients, and that percentage may be based on the total number of receiving clients. For example, an encoder for a larger number of receiving clients may have a lower percentage of ACKs received before predictive encoding starts with a new LTRP.

An example method for long term reference picture (LTRP) management, such as at a multimedia relay server, includes sending a new LTRP for an image sequence to a plurality of receivers and receiving an acknowledgement (ACK) from one of the plurality of receivers. When the number of ACKs received is less than a number of receivers, encoding images of the image sequence with respect to a previous LTRP. When the number of ACKs received is equal to a number of receivers, encoding images of the image sequence with respect to the new LTRP.

Figure 8:
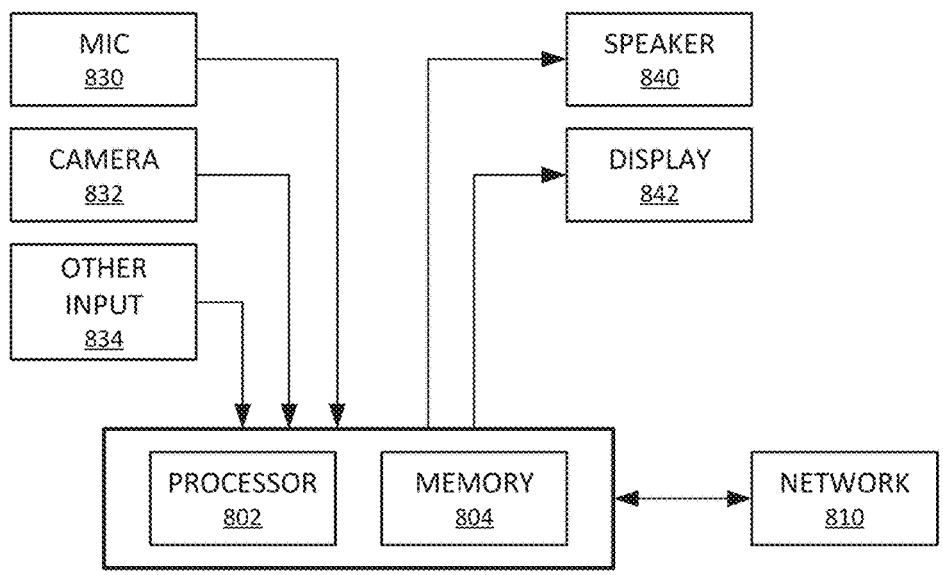
FIG. 8 illustrates an example relay system endpoint device.

FIG. 8 illustrates an exemplary endpoint device 800. Endpoints 110.1-110.n of FIG. 1 may be implemented, for example, as endpoint device 800. Processor 802 and memory 804 are connected to network 810 and input/output devices. For example, microphone 830 may capture audio input at the location of the endpoint device 800, and one or more cameras 832 may capture still image and video input. Speaker 840 may present one or more audio feeds received from other endpoints via network 810. Display 842 may present one or more received image feeds. Network 810 may enable communication with a relay server or other endpoint devices. Endpoint device 800 may include an encoder (not depicted) to encode data captured from mic 830 and camera 832. Similarly, endpoint device 800 may include a decoder (not depicted) for decoding audio and video to be presented on speaker 840 and display 842. Such an encoder and decoder may be implemented as software run on processor 802 or may be a hardware encoding or decoding device accessible to processor 802.

Other input 834 devices may include a mouse or keyboard for ordinary computer input and control and may also include other types of sensors such as a heart rate monitor or physical motion sensor such as an accelerometer. An accelerometer and heart rate sensor may be worn by an operator, for example in a watch that is wirelessly connected to endpoint device 800. A higher heart rate may indicate a higher priority for associated captured media feeds. Larger or faster motion, or a distinctly recognized motion such as a particular gesture, may also indicate a higher or lower priority for captured or received video feeds.

In some cases, data from other input devices 834 may be sent on to a relay server and other endpoints as a media feed; in other cases, data from other input devices may be only be used locally in determining a priority for other media feeds such as audio or video. For example, data from a heartrate sensor may be sent as a media feed to other endpoints, or data from a heartrate sensor may only be used locally to contribute to priority metadata associated with simultaneously captured audio or video.

A relay server such as relay server 120 of FIG. 1 may include a processor 802, memory 804, and network 810 of FIG. 8. In some aspects, an endpoint may also act as a relay server, such that a relay server may also include other input and output elements of FIG. 8.

FIG. 9 is an example of data streams sent from a source endpoint of a conference session. In some aspects, a single sourcing endpoint may provide multiple audio streams (A1, A2) and video streams (V1, V2, V3) at different quality levels. Other sensor input data may also be provided as a media stream for later downstream analysis. In some aspects, multiple quality levels of media may be provided via a layered coding system. For example, low video quality V3 may be provided as a base layer of a layered coding system, while media and high-quality video V2, V1 may be provided as enhancement layers of the layered coding system. Priority metadata associated with sourced media streams may be determined at the sourcing endpoint (P). Additionally, viewer preferences for viewing of received media feeds may also be sent as a feedback data stream to a relay server.

As described above, one aspect of the present technology is the gathering and use of data available from various sources to improve the presentation to users. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services. In another example, users can select not to provide location information. In yet another example, users can select to not provide precise location information, but permit the transfer of location zone information. In the context of a system, an example user's preference to view or hear certain other participant's face or voice based on a known personal relationship with one or more other session participants may or may not be shared with other participants or the system based on the user's selection to "opt in" or "opt out" of sharing such information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Some aspects may be implemented, for example, using a non-transitory computer-readable storage medium or article which may store an instruction or a set of instructions that, if executed by a processor, may cause the processor to perform a method in accordance with the disclosed aspects. Processor 202 of FIG. 2 may be an example of such as processor. The exemplary methods and computer program instructions may be embodied on a non-transitory machine-readable storage medium. In addition, a server or database server may include machine readable media configured to store machine executable program instructions. The features of the aspects of the present invention may be implemented in hardware, software, firmware, or a combination thereof and utilized in systems, subsystems, components or sub-components thereof. The "machine readable storage media" may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some aspects, variations within the scope and spirit of the invention will be apparent to those of ordinary skill in the art. Thus, the invention should be considered as limited only by the scope of the appended claims.

We claim:

1. A method of generating a media feed comprising a plurality of media types from an endpoint in a conference session including a plurality of endpoints, comprising:
  generating a media feed at a source device that is the endpoint;
  determining, at the source device, a priority value for the endpoint and associated with the plurality of media types in the generated media feed, wherein the priority value represents a prioritization of the endpoint amongst the plurality of endpoints;
  transmitting the media feed including metadata representing the priority value and a new long-term reference picture (LTRP) for an image sequence to a plurality of receiving devices of the conference session;
  receiving acknowledgement(s) (ACK(s)) of the new LTRP from the plurality of receiving devices;
  when the number of ACKs received is less than a number of receivers, encoding images of the image sequence with respect to a previous LTRP;
  when the number of ACKs received is equal to a number of receivers, encoding images of the image sequence with respect to the new LTRP; and
  transmitting the encoded images to the plurality of receiving devices.

2. The method of claim 1, wherein the priority value is derived from content of the media feed.

3. The method of claim 1, wherein the priority value is derived from input from a heartrate monitor.

4. The method of claim 1, wherein the priority value is derived from input from a motion sensor.

5. The method of claim 1, wherein the priority value is derived from output of a speech recognition process.

6. The method of claim 1, wherein the priority value is derived from data received by the source device from a device of the conference session that renders the media feed.

7. The method of claim 1, further comprising:
  receiving the media feed and associated priority metadata;
  selecting a presentation mode for the received media feed based on its received priority value; and
  presenting the received media feed based on the selected presentation mode.

8. The method of claim 1, further comprising:
  receiving the media feed and its priority metadata;
  selecting a conference management operation on the received media feed based on its priority metadata; and
  transmitting the received media feed having been processed by the selected conference management operation to a further device of the conference session.

9. The method of claim 1, further comprising:
  encoding a plurality of instantaneous decoder refresh (IDR) frames, each IDR frame corresponding to respective layers of a layered multimedia coding system at a common media time; and
  sending the IDR frames sequentially at different transmission times to a receiver.

10. The method of claim 1, further comprising:
  sending a new long-term reference picture (LTRP) for an image sequence to a plurality of receiving devices;
  receiving an acknowledgement (ACK) from one of the plurality of receiving devices;
  when the number of ACKs received is less than a number of receivers, encoding images of the image sequence with respect to a previous LTRP; and
  when the number of ACKs received is equal to a number of receivers, encoding images of the image sequence with respect to the new LTRP.

11. A communication management method, comprising:
  receiving a media feed and associated priority metadata of an endpoint in a conference session, wherein the associated priory metadata provides a prioritization of the endpoint amongst a plurality of endpoints in the conference session;
  selecting a conference management operation on the received media feed based on its priority metadata; and
  transmitting the received media feed having been processed by the selected conference management operation and including a new long-term reference picture (LTRP) for an image sequence to a plurality of receiving devices of the conference session;
  receiving acknowledgement(s) (ACK(s)) of the new LTRP from the plurality of receiving devices;
  when the number of ACKs received is less than a number of receivers, encoding images of the image sequence with respect to a previous LTRP;
  when the number of ACKs received is equal to a number of receivers, encoding images of the image sequence with respect to the new LTRP; and
  transmitting the encoded images to the plurality of receiving devices.

12. The method of claim 11, wherein the conference management operation includes: selecting which of the plurality of media feeds to retain based on the priority values.

13. The method of claim 12, wherein the selecting media feeds retains media feeds with a respective priority value above a threshold.

14. The method of claim 12, wherein the selecting media feeds retains all video feeds and does not retain audio feeds with a respective priority value below a threshold.

15. The method of claim 11,
  wherein the received media feed includes an instantaneous decoder refresh (IDR) frame; and wherein the conference management operation comprises choosing transmission times for transmission of the IDR frame to different receiving clients to be different from each other.

16. The method of claim 1, wherein the priority value for the endpoint is derived from analysis of media content of the media feed.

17. A method of transmitting media streams, comprising:
sending a new long-term reference picture (LTRP) for an image sequence to a plurality of receiving devices in a video conference;
receiving acknowledgements (ACKs) of the new LTRP from the plurality of receiving devices;
when the number of ACKs received is less than a threshold number of receivers, encoding images of the image sequence with respect to a previous LTRP;
when the number of ACKs received is equal to or greater than the threshold number of receivers, encoding images of the image sequence with respect to the new LTRP; and
sending the encoded images to the plurality of receiving devices.

18. The method of claim 17, wherein the threshold number of receivers is equal to the number of receiving devices in the plurality of receiving devices.

19. The method of claim 17, wherein the threshold number of receivers is a percentage of a total number of receivers subscribed to the image sequence.

20. The method of claim 17, wherein the threshold number of receivers is a percentage of a total number of receivers subscribed to the image sequence, the percentage is based on the total number, and the percentage is lower for a higher total number.

21. A system for generating a conference session media feed, comprising:
a transmitter for sending an encoded video stream to receiving devices of a video conference;
a receiver for receiving acknowledgements (ACKs) from conference participants;
an encoder for encoding an image sequence into the encoded video stream; and
a processor and instructions to cause:
transmitting, with the transmitter, the encoded video stream including a new long-term reference picture (LTRP) to a plurality of the receiving devices;
receiving, with the receiver, acknowledgements (ACKs) of the new LTRP from the plurality of receiving devices;
when the number of ACKs received is less than a threshold number of receivers in the plurality of receivers, encoding, with the encoder, images of the image sequence with respect to a previous LTRP; and
when the number of ACKs received is equal to or greater than the threshold number of receivers in the plurality of receivers, encoding, with the encoder, images of the image sequence predicted with respect to the new LTRP.

22. The system of claim 21, wherein the threshold number of receivers is equal to the number of receiving devices in the plurality of receiving devices.

23. The system of claim 21, wherein the threshold number of receivers is a percentage of a total number of receivers subscribed to the image sequence.

24. The system of claim 21, wherein the threshold number of receivers is a percentage of a total number of receivers subscribed to the image sequence, the percentage is based on the total number, and the percentage is lower for a higher total number.

25. A non-transitory computer readable media storing instructions, that when executed on a processor, cause:
sending a new long-term reference picture (LTRP) for an image sequence to a plurality of receiving devices in a video conference;
receiving acknowledgements (ACKs) of the new LTRP from the plurality of receiving devices;
when the number of ACKs received is less than a threshold number of receivers, encoding images of the image sequence with respect to a previous LTRP; and
when the number of ACKs received is equal to or greater than the threshold number of receivers, encoding images of the image sequence with respect to the new LTRP.

26. The media of claim 25, wherein the threshold number of receivers is equal to the number of receiving devices in the plurality of receiving devices.

27. The media of claim 25, wherein the threshold number of receivers is a percentage of a total number of receivers subscribed to the image sequence.

28. The media of claim 25, wherein the threshold number of receivers is a percentage of a total number of receivers subscribed to the image sequence, the percentage is based on the total number, and the percentage is lower for a higher total number.

* * * * *